United States Patent
Häkkinen et al.

(10) Patent No.: US 6,763,011 B1
(45) Date of Patent: Jul. 13, 2004

(54) METHOD AND ARRANGEMENT FOR TIMING THE DIVERSITY WEIGHT CHANGES IN A CELLULAR RADIO SYSTEM

(75) Inventors: Hannu Häkkinen, Espoo (FI); Kari Pehkonen, Tokyo (JP); Esa Malkamäki, Espoo (FI)

(73) Assignee: Nokia Mobile Phones, Ltd., Espoo (FI)

( * ) Notice: Subject to any disclaimer, the term of this patent is extended or adjusted under 35 U.S.C. 154(b) by 867 days.

(21) Appl. No.: 09/679,791

(22) Filed: Oct. 5, 2000

(30) Foreign Application Priority Data

Oct. 8, 1999 (FI) .......................................... 19992174

(51) Int. Cl.[7] ................................................. H04J 3/14
(52) U.S. Cl. .................. 370/337; 370/524; 455/69; 455/70; 455/272; 375/148
(58) Field of Search ............................. 370/350, 337, 370/508, 524; 375/144, 145, 148, 149, 347; 455/68, 69, 70, 272, 275, 276.1

(56) References Cited

U.S. PATENT DOCUMENTS

| | | | |
|---|---|---|---|
| 5,634,199 A | | 5/1997 | Gerlach et al. ............... 455/63 |
| 5,751,763 A | * | 5/1998 | Bruckert ..................... 375/141 |
| 5,781,845 A | * | 7/1998 | Dybdal et al. ................ 455/65 |
| 5,887,037 A | * | 3/1999 | Golden et al. .............. 375/347 |
| 5,973,638 A | | 10/1999 | Robbins et al. ............. 342/172 |
| 5,999,826 A | * | 12/1999 | Whinnett .................... 455/561 |

FOREIGN PATENT DOCUMENTS

| | | |
|---|---|---|
| EP | 0793360 | 9/1997 |
| EP | 0 999 658 A2 | 5/2000 |
| EP | 1001557 | 5/2000 |
| WO | WO 97/34387 | 9/1997 |

OTHER PUBLICATIONS

Japanese Patent Document No. JP 10190537—English translation of the Abstract attached.

* cited by examiner

Primary Examiner—Huy D. Vu
Assistant Examiner—Lee T. Khuong
(74) Attorney, Agent, or Firm—Perman & Green, LLP

(57) ABSTRACT

A method and an arrangement are provided for timing a change of diversity weights in a radio connection between a base station and a terminal. A response timing mode is selected from a number of predefined response timing modes. The terminal is informed about the selected response timing mode. An initiation is received from the terminal and it is responded to the initiation by changing certain diversity weights so that the exact moment of time for effecting the change is determined by the selected response timing mode.

6 Claims, 3 Drawing Sheets

METHOD AND ARRANGEMENT FOR TIMING THE DIVERSITY WEIGHT CHANGES IN A CELLULAR RADIO SYSTEM

TECHNOLOGICAL FIELD

The invention concerns generally the field of controlling transmission power and phase in a radio link between a base transceiver station and a mobile terminal. Especially the invention concerns the timing factors that are related to the effecting of changes is transmission power and phase.

BACKGROUND OF THE INVENTION

Spatial diversity in a cellular radio system means that the communication connection between a portable terminal and a base transceiver station or BTS goes through at least two antennas at the BTS simultaneously. In order to take full advantage of spatial diversity in the downlink direction, the relative transmission power and phase directed through the different antennas must be carefully balanced. The relative transmission power levels and phases of the different antennas may be represented by certain complex weights which are determined by a controller unit within the BTS or other fixed parts of the network.

A number of downlink diversity schemes have been proposed to the standard that is to define the WCDMA or Wideband Code Division Multiple Access part of a proposed third generation digital cellular telecommunications system. It is known to set up a so-called closed loop TX diversity scheme, i.e. to make a portable terminal or UE (User Equipment) to transmit feedback information in the uplink direction and to utilize this feedback information in the UTRAN or UMTS Terrestrial Radio Access Network (where UMTS comes from Universal Mobile Telecommunication System) to adjust the antenna weights. Communication errors may cause the feedback loop not to work properly, which in turn may cause the UTRAN to put different antenna weights in use than what the UE actually requested. In order to recover from such an error condition the UE may optionally utilize so-called verification of the antenna weights. The aim of verification is to check, whether proper antenna weights are in use at a specific base station.

The verification algorithms are known as such and do not fall within the scope of the present patent application. However, in order to the known verification methods to work properly the UE must know exactly the moment when the BTS changes the antenna weights. The proposals that are known at the priority date of the present patent application suggest that since the downlink transmission consists of consecutive frames of constant duration and predefined temporal structure, all changes in downlink transmission power (and hence also in antenna weights) should take place at a certain moment which is defined in relation to the known parts of the frame. Especially it has been proposed that since all downlink frames comprise a certain pilot field, the changes in downlink transmission power should always be effected at the beginning of the pilot field. This is implicitly assumed to mean the beginning of the immediately next pilot field that is in turn to be transmitted after the moment when the feedback information was received at the UTRAN.

FIG. 1 illustrates some timing considerations that relate to the above-explained known arrangement. Line 101 is a train of downlink transmission slots as they appear at a base station, and line 102 is the same train of downlink transmission slots as they appear at a UE. Line 103 is a train of uplink transmission slots as they appear at a UE, and line 104 is the same train of uplink transmission slots as they appear at a base station. The finite propagation velocity of radio waves causes there to be a propagation delay D: a receiving station sees the same train of transmission slots by the amount of D later than the transmitting station. The relation in time between uplink and downlink slot borders is fixed to achieve certain synchronization.

Each uplink transmission slot (or certain predefined uplink transmission slots) in FIG. 1 comprises a field for feedback bits, and each downlink transmission slot (or certain predefined uplink transmission slots) comprises a pilot field. Let us assume that the UE transmits, in field 105, certain feedback bits which the BS should interprete as a request for changing antenna weights at the beginning of the next pilot field, which is field 106. The propagation delay causes the BS to receive the feedback bits by the amount of D later than the moment when the UE transmitted them. It is clear that the longer is the propagation delay D, the less time the UTRAN, which the BS belongs to, has to react upon the feedback bits and to effect the requested change in antenna weights. The length of the propagation delay is directly proportional to the distance between the UE and the BS, so especially in large cells it may happen that it becomes physically impossible to effect the changes in the antenna weights before the transmission of the pilot field 106 is already going on.

An obvious solution which would enable the UTRAN to always have enough time to process the feedback bits and effect the requested changes would be to define that the changes become effective not at the beginning of the next pilot field but at the beginning of the P:th pilot field after the reception of the feedback bits in the uplink direction, where P>1. However, in most small cells (and even in large cells if the UE is located in the central part of the cell) such additional delay in transmission control is completely unnecessary and may have serious adverse effects on system stability: the performance of CDMA systems is known to be heavily dependent on effective control in transmission power and phase.

Another obvious solution would be to allow the UTRAN to effect the changes in antenna weights at the beginning of the first pilot field that comes after the necessary processing has been completed, regardless of whether it is the next pilot field after the reception of the feedback bits or not. This leaves it on the responsibility of the UE to deduce, which pilot field is the first one where the changes are effective. Although the UE may have a good estimate of the length of the current propagation delay, leaving the exact moment of effecting the changes half undefined causes uncertainty and may give rise to serious errors in the power control arrangement.

SUMMARY OF THE INVENTION

It is an object of the present invention to provide a method and an arrangement for timing the changes in the antenna weights without unnecessary delay but with a completely deterministic way.

The objects of the invention are achieved by defining a number of modes for the base station for responding to feedback bits in uplink slots that concern changes in antenna weights, and by signaling to the UE which mode is currently in use.

The method according to the invention is characterized in that it comprises the steps of selecting a response timing mode from a number of predefined response timing modes informing the terminal about the selected response timing mode receiving an initiation from the terminal and responding to said initiation by changing certain diversity weights so that the exact moment of time for effecting the change is determined by said selected response timing mode.

The invention also applies to an arrangement that is characterized in that it comprises means for selecting a response timing mode from a number of predefined response timing modes means for informing the terminal about the selected response timing mode means for receiving an initiation from the terminal and means for responding to said initiation by changing certain diversity weights so that the exact moment of time for effecting the change is determined by said selected response timing mode.

The length of the propagation delay between the base station and the UE is determined at the very beginning of establishing the communication connection therebetween, and thereafter it is constantly monitored in order to preserve the correct synchronization between uplink and downlink slots and frames. The base station or other controlling entity within the fixed parts of the network may use the known value of the propagation delay to constantly or regularly estimate, how much time it would need to react to such feedback bits from the UE that constitute a request for changing antenna weights. A response timing mode is then selected from a number of predefined modes. Each mode means a specified delay (in number of frames) it will take for the base station to effect the changes in antenna weights after it has received the corresponding feedback bits from the UE. The selected mode is signalled to the UE so that it will know exactly, before transmitting any feedback bits that would cause changes in antenna weights, at which point of the downlink transmission stream such requested changes will take place.

An advantageous way of implementing the signalling is to add a new information element to an existing signalling message that characterizes other aspects related to transmission diversity mode. The number of bits required for the new information element depends on the number of defined response timing modes. If only two modes are defined, the size of the new information element may be a single bit.

BRIEF DESCRIPTION OF DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
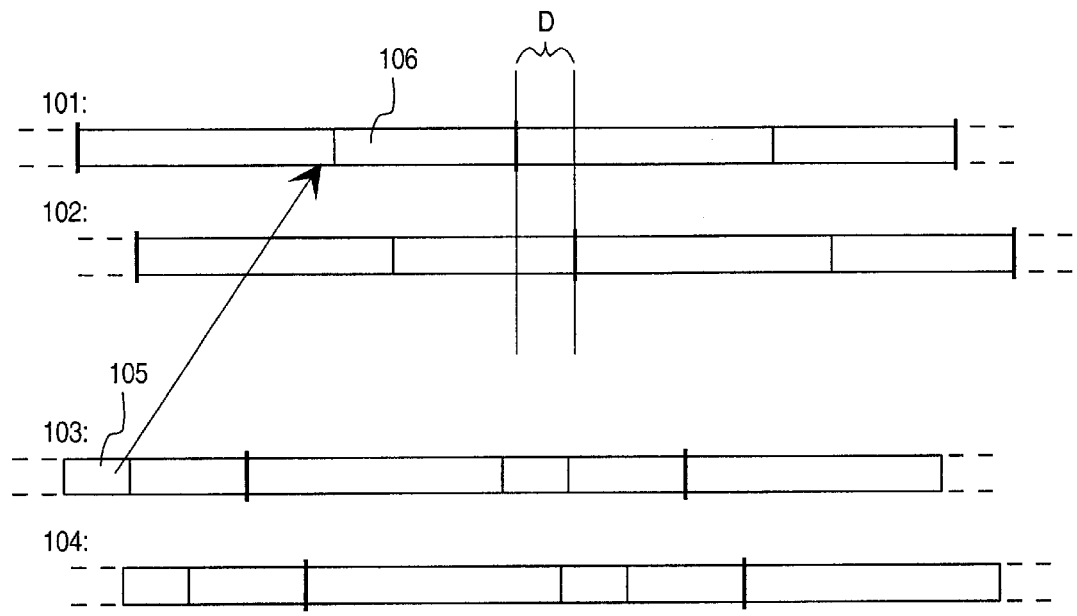
FIG. 1 illustrates some known timing aspects.
Figure 2:
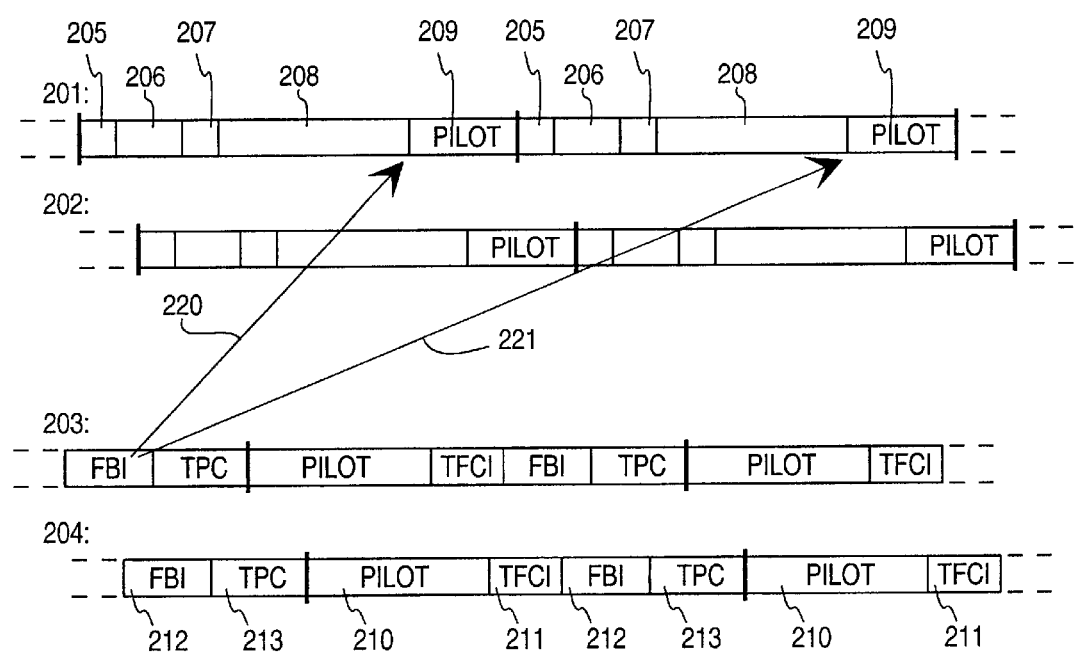
FIG. 2 illustrates some timing aspects of a method according to the invention.

FIG. 2 illustrates the relative timing of uplink and downlink slots at a base station and a UE. Line 201 is a train of downlink transmission slots as they appear at a base station, and line 202 is the same train of downlink transmission slots as they appear at a UE. Line 203 is a train of uplink transmission slots as they appear at a UE, and line 204 is the same train of uplink transmission slots as they appear at a base station. The duration in time of each slot in both uplink and downlink direction is called a time slot and its length is 2560 chips. The time slots are numbered and the synchronization between uplink and downlink has been determined so that from the moment when the UE receives the beginning of a certain i:th downlink time slot to the moment when the UE begins transmitting in a corresponding i:th uplink time slot there are 1024 chips.

The exemplary slot structure shown in FIG. 2 refers to the known DPCCH (Dedicated Physical Control CHannel) both in the downlink and uplink direction.

The downlink slot consists of a TFCI field (Transport Format Combination Indicator) 205, a first data field 206, a TPC field (Transmit Power Control) 207, a second data field 208 and a pilot field 209. The data fields are related to a different channel than the DPCCH. The uplink DPCCH slot consists of a pilot field 210, a TFCI field 211, an FBI field (Feedback Information) 212 and a TPC field 213. The uplink DPCCH slot of which only the last two fields is shown in FIG. 2 is associated with the (i−1):th uplink time slot, and the two downlink DPCCH slots which are shown in FIG. 2 in their entirety are associated with the i:th and (i+1):th downlink time slot respectively.

The feedback bits that may potentially cause a UTRAN to change antenna weights at the base station are located in the FBI field 212 of the uplink DPCCH slot. Arrow 220 refers to a first feedback response timing mode at the UTRAN where the reception of such feedback bits in the (i−1):th uplink time slot causes the antenna weights to be changed at the beginning of the pilot field in the i:th downlink time slot. Arrow 221 refers to a second feedback response timing mode at the UTRAN where the reception of such feedback bits in the (i−1):th uplink time slot that cause a UTRAN to change antenna weights causes the antenna weights to be changed at the beginning of the pilot field in the (i+1):th downlink time slot.

We may briefly analyze some exemplary timing considerations on the basis of the slot structure shown in FIG. 2. The number $N_{pilot}$ of downlink pilot bits in field 209 may be e.g. four if a spreading factor SF=512 is used, and eight if a spreading factor SF=256 is used. In a worst case the number $N_{TPC}$ of uplink TPC bits in field 213 is only one. We may calculate the time T which is available for propagation delays and processing of the feedback information at the UTRAN from the formula $$T = 2560 - 1024 - \frac{N_{pilot}}{2} SF + N_{TPC} \cdot 256 \qquad (1)$$

which gives the time in the unit of chips. The division of $N_{pilot}$ by 2 comes from the fact that the pilot bits are QPSK-modulated (Quadrature Phase Shift Keying) which means that the number of chips is only half of the number of bits. Placing $N_{pilot}$=4 and SF=512 (or equally $N_{pilot}$=8 and SF=256) and $N_{TPC}$=1 gives T=768 chips which corresponds to approximately 200 µs. It is known that certain alternative settings may be used in determining the number of bits in the fields of DPCCH slots; in a slightly more advantageous case we might have $N_{pilot}$=4, SF=256 and $N_{TPC}$=2 which results in T=1536 chips or approximately 400 µs.

Actually it would be possible to slightly increase the time marginal available for processing and propagation delay by choosing the mutual order of the bits in the FBI field 212 in the most optimal way. There are two types of bits that may appear in the FBI field. The so-called D bit is the one which is decisive in determining, whether or not the UTRAN should change the antenna weights. The other bit type is the S bit which relates to SSDT (Site Selection Diversity TPC) and does not involve similar time-critical aspects. If the S bit is present, there is only one TPC bit in field 213. If there is no S bit, there are two TPC bits. If we define that the D bit is always transmitted first, the time marginal T increases by 256 chips. However, this addition is not enough to ensure that the changes in antenna weights are ready before the immediately following downlink pilot field.

Above we already mentioned the definition of at least two different response timing modes. In general we may define that according to the present invention there are M distinct response timing modes for a base station which are defined so that when the feedback bits are received in the j:th uplink time slot, response timing mode k means that the changes in antenna weigths are effected at the beginning of the pilot field in the (j+k):th downlink time slot where k=1, 2, ..., M and the positive integer M is at least two. If the numbering of the time slot is cyclic with a cycle C, it is most unambiguous to define the downlink time slot number that corresponds to the k:th response timing mode as j+k) mod C, where "mod" is the modulus operator.

As the most straightforward case we may consider the definition of two response timing modes which are those illustrated by arrows 220 and 221 in FIG. 2. When the UTRAN knows the propagation delay between a base station and a UE, it is easy to deduct the (two-way) propagation delay from the result given by formula (1) and to check, whether the remaining time is enough to effect the processing required to put a certain requested set of antenna weights into use. In practice it is most advantageous to store a threshold value for the propagation delay so that for all base station—UE connections where the propagation delay is less than the threshold value, the first response timing mode (arrow 220) is selected and for those connections where the propagation delay is equal to or larger than the threshold value, the second response timing mode (arrow 221) is selected.

If there are more than two defined response timing modes, it is most advantageous to set up a mapping table where a set of threshold values divides the range of potentially occurring propagation delays into bins. Each bin corresponds to a certain response timing mode. For each base station—UE connection it is checked, into which bin the propagation delay falls, and the corresponding response timing mode is selected.

Figure 3:
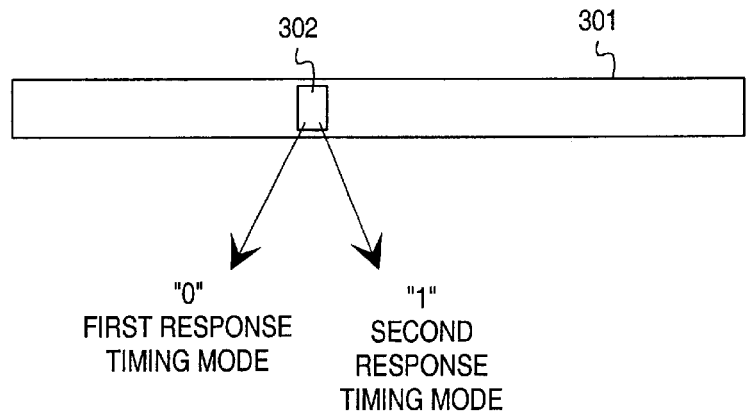
FIG. 3 illustrates schematically a signalling message for signalling a response timing mode

Next we will describe the signalling of the selection of response timing mode to the UE. It is known to use a certain downlink signalling message to transmit to the UE certain indicators that describe the transmit diversity mode which is used at the base station. In the framework of UMTS this indicator is known as the FB Mode Transmit Diversity signalling indicator. According to an advantageous embodiment of the invention a further information element is added therein to indicate the response timing mode selected for the base station. FIG. 3 illustrates schematically a signalling message 301 the other structure of which is beyond the scope of this invention. At a certain field 302 there appears an indicator bit the value of which is either 0 or 1, corresponding to the first response timing mode (arrow 220 in FIG. 2) or the second response timing mode (arrow 221 in FIG. 2) respectively. Naturally if several response timing modes are defined, more bits must be allocated to the response timing mode indicator.

Figure 4:
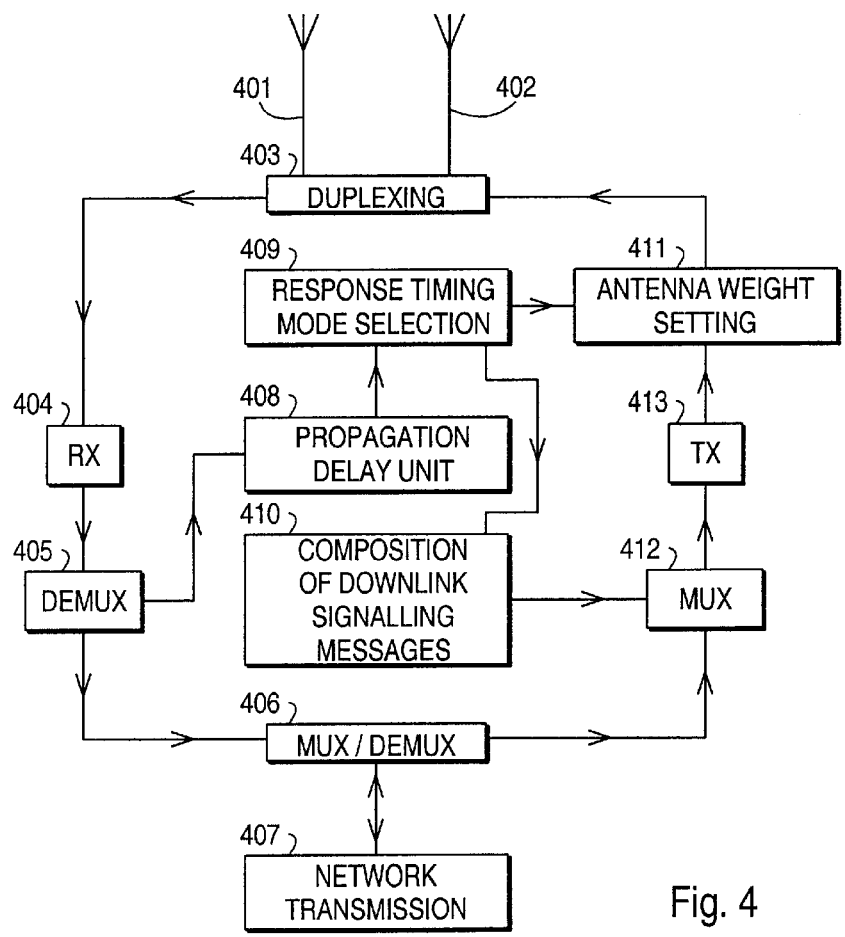
FIG. 4 illustrates schematically a base station according to an embodiment of the invention and FIG. 5 illustrates schematically a UE according to an embodiment of the invention.

FIG. 4 illustrates schematically a base station which can be used to implement the present invention. The two antennas 401 and 402 are coupled to a duplexing block 403 which separates received signals from transmitted signals. Received signals are directed into a receiver 404 which converts them into digital bit streams on baseband frequency. A demultiplexer 405 separates received payload data from received control information, of which the former is directed through another multiplexer/demultiplexer 406 into a network transmission unit 407 and the latter is directed to the control parts of which especially the propagation delay unit 408 is shown. It associates each communication connection with a certain measured propagation delay.

The information about the propagation delays is used in block 409 where a corresponding response timing mode is selected. The selection result is directed on one hand to the signalling messages composition block 410 where the corresponding indicator value is selected and inserted to those signalling messages that contain the FB Mode Transmit Diversity signalling indicator. On the other hand the response timing mode selection result is coupled to the actual antenna weight implementing block 411. The information to be transmitted to the UE is assembled in the multiplexer 412 and converted into radio frequency in the transmitter 413.

Figure 5:
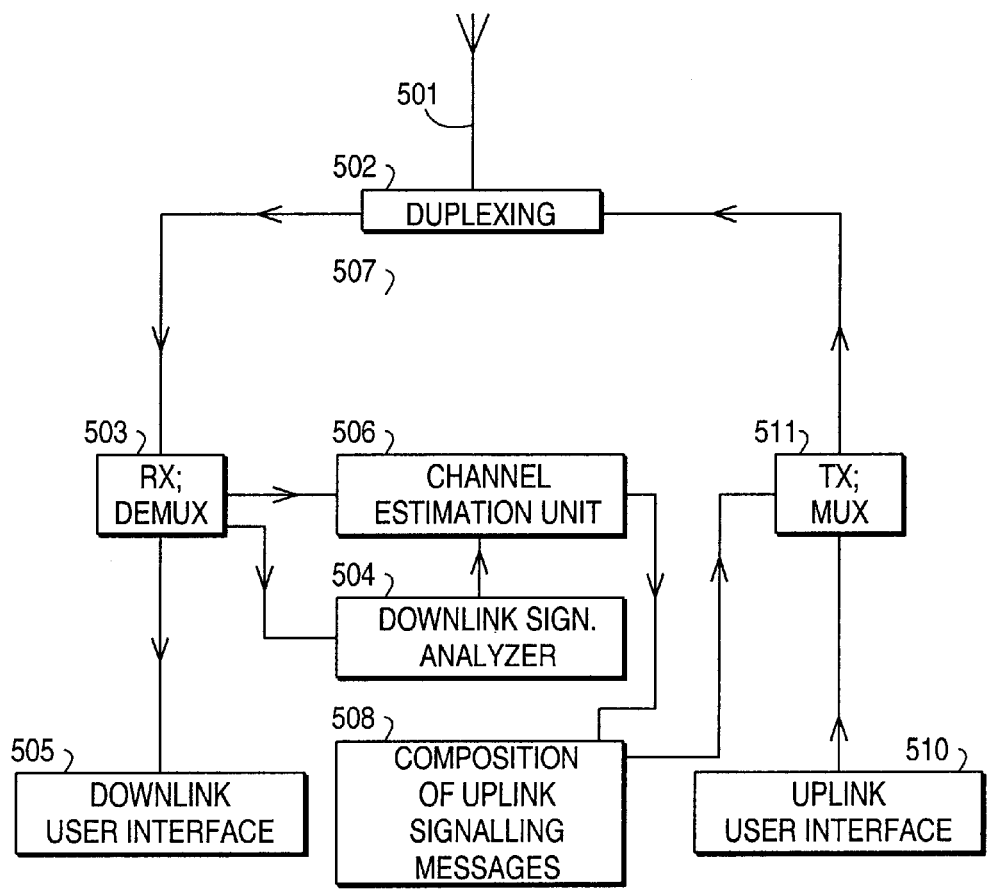

FIG. 5 illustrates schematically a user equipment device which can be used to implement the present invention. The antenna 501 is coupled to a duplexing block 502 which separates received signals from transmitted signals. Received signals are directed into a receiver/demultiplexer 503 which converts them into digital bit streams on baseband frequency and performs other known duties of portable terminal receivers. Among other it implements the antenna verification function. Payload data is directed into a downlink user interface part 505 which conceptually covers all such separate devices which are used to present information to the user. Of the control parts of the UE there is especially shown a channel estimation unit 506 which produces the results on which the setting and verification of antenna weights is based. The eventual need for antenna weight verification is reported to the signalling messages composition block 508 which sets the FBI bit in a subsequent uplink signalling message accordingly. The uplink user interface block 510 houses all such components that are required to convert user inputs into transmittable form. The transmitter block 511 takes care of all transmissions.

From the receiver/demultiplexer 503 there is also a connection to a downlink signalling analyzer block 504 which detects, among others, the value of the response timing mode indicator from the downlink signalling messages and informs the channel estimation unit about the mode which is in use. This way the channel estimation unit knows the exact moment when the antenna weights will change and is able to react properly to the changes.

In the foregoing we have assumed that the selection of response timing mode is made dynamically for each connection. In some simpler embodiments of the invention the selection may be based on cell size or processing capacityt: e.g. in large cells or in the cells of base stations with limited processing capacity the slower response timing mode could be always used.

The invention does not limit the point within a slot or frame which is chosen to be the changing point of antenna weights. Although it is advantageous to select it to be the same as the point of changing transmission power (i.e. the beginning of the pilot field), it is also possible to define some other point as the changing point.

What is claimed is:

1. A method for timing a change of diversity weights in a radio connection between a base station and a terminal, comprising the steps of:

selecting a response timing mode from a number of predefined response timing modes, informing the terminal about the selected response timing mode, receiving an initiation from the terminal and responding to said initiation by changing certain diversity weights so that the exact moment of time for effecting the change is determined by said selected response timing mode.

2. A method according to claim 1, wherein the step of selecting a response timing mode comprises the substeps of:

measuring a propagation delay between the base station and the terminal and mapping the measured propagation delay into a certain response timing mode.

3. A method according to claim 1, wherein the step of selecting a response timing mode comprises the substep of selecting a response timing mode based on the cell size of the base station.

4. A method according to claim 1, wherein the step of selecting a response timing mode comprises the substep of selecting a response timing mode based on the processing capacity of the base station.

5. A method according to claim 1, wherein the steps of receiving an initiation from the terminal and responding to said initiation by changing certain diversity weights comprise the substeps of:

receiving said initiation from the terminal in a certain j:th time slot and effecting the change of diversity weigths in either the j+1) mod M:th time slot or the (j+2) mod M:th time slot depending on which of of two predefined response timing modes has been selected, where M is the length of the cycle in a cyclic numbering scheme of time slots.

6. An arrangement for timing a change of diversity weights in a radio connection between a base station and a terminal, comprising:

means for selecting a response timing mode from a number of predefined response timing modes, means for informing the terminal about the selected response timing mode, means for receiving an initiation from the terminal and means for responding to said initiation by changing certain diversity weights so that the exact moment of time for effecting the change is determined by said selected response timing mode.

\* \* \* \* \*